(12) United States Patent
Preundler et al.

(10) Patent No.: US 11,338,383 B2
(45) Date of Patent: May 24, 2022

(54) TIG WELDING TORCH BODY, TIG WELDING TORCH HANDLE, AND TIG WELDING TORCH HAVING SUCH A TIG WELDING TORCH BODY AND TIG WELDING TORCH HANDLE

(71) Applicant: Fronius International GmbH, Pettenbach (AT)

(72) Inventors: David Preundler, Pettenbach (AT); Klaus Oberndorfer, Pettenbach (AT); Anton Preundler, Pettenbach (AT); Alexander Zeitlinger, Pettenbach (AT)

(73) Assignee: Fronius International GmbH, Pettenbach (AT)

( * ) Notice: Subject to any disclaimer, the term of this patent is extended or adjusted under 35 U.S.C. 154(b) by 433 days.

(21) Appl. No.: 16/468,539

(22) PCT Filed: Apr. 13, 2018

(86) PCT No.: PCT/EP2018/059483
§ 371 (c)(1),
(2) Date: Jun. 11, 2019

(87) PCT Pub. No.: WO2018/189349
PCT Pub. Date: Oct. 18, 2018

(65) Prior Publication Data
US 2020/0086414 A1 Mar. 19, 2020

(30) Foreign Application Priority Data
Apr. 13, 2017 (EP) .................................... 17166559

(51) Int. Cl.
*B23K 9/167* (2006.01)
*B23K 9/29* (2006.01)
(Continued)

(52) U.S. Cl.
CPC .............. *B23K 9/167* (2013.01); *B23K 9/285* (2013.01); *B23K 9/291* (2013.01); *B23K 9/323* (2013.01); *B23K 9/325* (2013.01)

(58) Field of Classification Search
CPC ........ B23K 9/167; B23K 9/285; B23K 9/291; B23K 9/323; B23K 9/325; B23K 9/28; B23K 9/29; B23K 9/32
See application file for complete search history.

(56) References Cited

U.S. PATENT DOCUMENTS 5,571,427 A * 11/1996 Dimock ................. B23K 9/296
219/136
5,892,199 A * 4/1999 Ahmed .................. B23K 9/167
219/137 R
(Continued)

FOREIGN PATENT DOCUMENTS

CN 1913999 A 2/2007
CN 102528249 A 7/2012
(Continued)

OTHER PUBLICATIONS

Chinese Office Action in Chinese Application No. 201880007109.4, dated Feb. 1, 2021 with English translation.
(Continued)

*Primary Examiner* — Brian W Jennison
(74) *Attorney, Agent, or Firm* — Collard & Roe, P.C.

(57) ABSTRACT

A tungsten inert gas welding torch body, a TIG welding torch handle, and a TIG welding torch has a gas channel terminating in front of the distal end of a plug-in element in an inlet opening arranged on the shell side of the plug-in element, and a central inlet mouth at the distal end of the plug-in element terminating in front of the distal end of the plug-in element in a return opening on the shell side at the plug-in element. The TIG welding torch handle has a second channel arranged coaxially to the central channel, and a third
(Continued)

channel arranged coaxially to the second channel. A connection is between the second channel and the third channel. The first channel has a mouth in the center of the receiving part, and each of the second and third channels has a mouth on the shell side of the receiving part.

16 Claims, 4 Drawing Sheets

(51) Int. Cl.
    *B23K 9/28*     (2006.01)
    *B23K 9/32*     (2006.01)

(56) References Cited

U.S. PATENT DOCUMENTS

| | | | |
|---|---|---|---|
| 6,534,747 B1 * | 3/2003 | Rehrig | B23K 9/29 |
| | | | 16/421 |
| 6,995,331 B2 * | 2/2006 | Samler | B23K 9/296 |
| | | | 219/138 |
| 8,507,823 B2 * | 8/2013 | Leeb | B23K 9/296 |
| | | | 219/75 |
| 8,866,036 B2 * | 10/2014 | Wada | B23K 9/325 |
| | | | 219/75 |
| 9,180,546 B2 * | 11/2015 | Jarvis | B23K 9/167 |
| 2007/0119840 A1 | 5/2007 | Flattinger et al. | |
| 2009/0050606 A1 * | 2/2009 | Smith | B23K 9/123 |
| | | | 219/74 |
| 2016/0074973 A1 | 3/2016 | Kachline et al. | |

FOREIGN PATENT DOCUMENTS

| | | |
|---|---|---|
| CN | 202667895 U | 1/2013 |
| DE | 10 2004 021 937 B3 | 6/2005 |
| EP | 2 603 345 B1 | 11/2013 |
| JP | S57-152380 A | 9/1982 |
| KR | 10-1341872 B1 | 12/2013 |

OTHER PUBLICATIONS

International Search Report of PCT/EP2018/059483, dated Jun. 26, 2018.

European Search Report in European Application No. 17166559.9-1702, dated Oct. 20, 2017.

European Office Action in EP Application No. 17166559.9-1702 dated Oct. 20, 2017 with English translation of relevant parts.

* cited by examiner

Fig. 4

TIG WELDING TORCH BODY, TIG WELDING TORCH HANDLE, AND TIG WELDING TORCH HAVING SUCH A TIG WELDING TORCH BODY AND TIG WELDING TORCH HANDLE

CROSS REFERENCE TO RELATED APPLICATIONS

This application is the National Stage of PCT/EP2018/059483 filed on Apr. 13, 2018, which claims priority under 35 U.S.C. § 119 of European Application No. 17166559.9 filed on Apr. 13, 2017, the disclosure of which is incorporated by reference. The international application under PCT article 21(2) was not published in English.

The invention relates to a TIG welding torch body, having a torch neck, an electrode holder for holding a welding electrode, a gas nozzle and a substantially cylindrical plug-in element arranged in the torch neck for detachable connection to a receiving part of a welding torch handle, which plug-in element has an inlet opening for the shielding gas and a gas duct, connected to the inlet opening, for conducting the shielding gas to the gas nozzle and is designed to transmit a welding current to the electrode holder.

The invention further relates to a TIG welding torch handle, having a current transmission element with a central duct, and a receiving part for detachable connection to a plug-in element of a welding torch body.

Finally, the invention is directed to a TIG welding torch having an aforementioned TIG welding torch body and an aforementioned TIG welding torch handle.

TIG (tungsten inert gas) welding torches with a non-consumable tungsten electrode consist of a welding torch body and a welding torch handle, which is connected to a hose package containing the individual lines for the welding current, the shielding gas and, where applicable, the coolant. To be able to exchange wear parts of the welding torch, but also to use different types of welding torches, the welding torch body is often connected detachably to the welding torch handle, and the hose package is connected to the corresponding connections on the welding torch handle. For the connection between the welding torch body and the welding torch handle, screw connections with the aid of a union nut and plug-in connections are conventional, which make exchange simpler and faster.

For example, DE 10 2004 021 937 B3 describes a welding torch, in which the torch head can be mounted on the torch handle by means of a plug-in connection.

EP 2 603 345 A1 also describes a TIG welding torch having a torch body which can be connected to the torch handle by plugging in.

Distinctions are made between a wide variety of welding torches, in particular those with only one shielding gas line and those with additional coolant lines, and likewise various hose packages with or without a coolant line. Depending on whether a gas-cooled or a water-cooled welding torch is used, and whether a hose package with or without coolant lines is present, different types of welding torch bodies and welding torch handles are necessary, which are produced by the welding component manufacturer and must be procured and stored by the user. This increases outlay on production and thus also costs for production and procurement.

The object of the present invention therefore consists in creating an aforementioned TIG welding torch body, TIG welding torch handle and TIG welding torch which should be constructed as identically as possible for all variants, in particular gas-cooled variants and water-cooled (or coolant-cooled) variants, so that the welding component manufacturer does not have to produce dedicated components for each variant, and the welder does not have to procure and store a corresponding number of components for each variant of welding torch. In particular, the present invention should allow a gas- or water-cooled welding torch body to be connected to essentially the same welding torch handle, and this welding torch handle to be connected to different hose packages (with and without coolant lines). Disadvantages of known designs should be avoided or at least reduced.

The object of the invention is achieved by an aforementioned TIG welding torch body in which the gas duct terminates in front of the distal end (the end facing the welding torch handle) of the plug-in element in an inlet opening arranged on the lateral-side of the plug-in element, and a substantially central inlet orifice is provided at the distal end of the plug-in element, and a return opening terminates on the lateral-side of the plug-in element in front of the distal end of the plug-in element. The fact that the gas duct in the plug-in element of the welding torch body is not, as usual, arranged axially in the centre and is connected to the gas nozzle means that more options can be created for connecting the welding torch body to the welding torch handle. To this end, a substantially central inlet orifice is also provided at the distal end of the plug-in element, and a return opening terminates on the lateral side of the plug-in element in front of the distal end of the plug-in element. Furthermore, the welding torch body of the type in question is relatively simple and cost-effective to produce. In the plug-in element of the welding torch body there can also be other ducts or the like, which interact with corresponding ducts in the welding torch handle to allow the shielding gas and any coolant present to run through the ducts as desired.

Advantageously, the plug-in element is designed for plug-in connection to the receiving part of the welding torch handle and has a so-called torch closure, which is designed to be fixed, preferably rotatably by 180°, on the receiving part of the welding torch handle. This allows the welding torch body to be fastened to and detached from the welding torch handle quickly, simply and most importantly without tools. The torch closure can be designed in different ways to allow fixing by an axial movement and rotation. For example, bayonet-like closures are conceivable.

In a gas-cooled TIG welding torch body, the central inlet orifice of the plug-in element is preferably connected to the return opening arranged on the lateral side of the plug-in element.

In a water-cooled TIG welding torch body, the plug-in element has a duct for supplying a coolant and a duct for returning the coolant, the duct for supplying the coolant being connected to the substantially central inlet orifice at the distal end of the plug-in element, and the duct for returning the coolant being connected to the return opening arranged on the lateral side of the plug-in element. As a result, a cooled TIG welding torch body is created, which can be connected to a corresponding TIG welding torch handle simply and quickly, and the ducts of which can be connected according to the hose package used (with or without coolant lines) to conduct the shielding gas and coolant. Although water is usually used as the coolant, other cooling liquids or cooling gases are also conceivable.

According to a further feature of the invention, the torch closure is of substantially tubular design and has fixing elements on the outside, which interact with fixing elements of complementary shape on the receiving part of the welding torch handle. This is a simple possibility for implementing the connection of the TIG welding torch body to the TIG welding torch handle by a combined axial and rotating movement, preferably by 180 degrees. The fixing elements can be formed by corresponding locking noses and guide grooves or the like.

The plug-in element, in this case at least the current-carrying part, is preferably formed from metal, in particular brass, and the torch closure is formed from plastic. Such materials have proven particularly suitable since they can be processed correspondingly easily and withstand the temperatures occurring during welding. In addition, safety-relevant functions, such as the maintenance of creep distances, can also be fulfilled.

The object according to the invention is also achieved by an aforementioned TIG welding torch handle in which are provided a second duct arranged coaxially to the duct, and a third duct arranged coaxially to the second duct, a connection being provided between the second duct and the third duct, and the first duct having an orifice in the centre of the receiving part, the second duct having an orifice on the lateral side of the receiving part, and the third duct having an orifice on the lateral side of the receiving part. The coaxial arrangement means an arrangement at different distances from the centre axis of the welding torch handle. The ducts can be implemented differently, for example, as simple bores or else in the form of annular spaces or the like. The specific arrangement of three ducts in total to conduct the shielding gas and/or a coolant, in particular water, allows the shielding gas or coolant to flow through the ducts in different ways depending on the connection of the lines and hoses of the hose package. Finally, the shielding gas and coolant enters the corresponding ducts in the connected welding torch body in question. The first duct has an orifice in the centre of the receiving part, the second duct has an orifice on the lateral side of the receiving part, and the third duct has an orifice on the lateral side of the receiving part. Such an arrangement of the orifices of the ducts inside the receiving part allows the shielding gas and the coolant to run differently depending on the welding media used (shielding gas and, if necessary, coolant) when connected to the correspondingly designed plug-in element of the TIG welding torch body, and both a gas-cooled welding torch body and a water-cooled welding torch body to be used on the same welding torch handle. The orifice, arranged on the lateral side of the receiving part, of the third duct is situated at the same location as the orifice, arranged on the lateral side, of the gas duct of the welding torch body and corresponds with same. The orifice of the first duct in the receiving part corresponds with the orifice of the duct for supplying a coolant in the plug-in element of the welding torch body when the welding torch body is connected. The orifice of the second duct on the lateral side of the receiving part in turn corresponds with the return opening for the coolant arranged on the lateral side of the plug-in element of the welding torch body. Corresponding connections for the welding current, the shielding gas and the coolant are provided on the end of the welding torch handle, which faces the hose package, and are connected according to the hose package used. Therefore, with the production of a substantially identically designed welding torch handle, it is possible to connect both a gas-cooled and a water-cooled welding torch body and to connect to a hose package with or without coolant lines. Depending on the desired combination, sealing elements for sealing off a duct or the seal from regions between ducts (e.g. by means of O-rings) etc. or similar auxiliary means may be necessary and are described below.

The current transmission element preferably consists of a sleeve of electrically conductive material with axially arranged slots for forming the second duct and an expansion sleeve of electrically insulating material, the central duct running in the interior of the expansion sleeve. Such a design contains both the first central duct in the welding torch handle and the second duct arranged coaxially to the first duct in a correspondingly space-saving manner. Owing to the expansion sleeve of electrically insulating material, correspondingly good electrical contact for transmitting the welding current is also produced, since the diameter of the sleeve is enlarged by the expansion sleeve and a corresponding contact pressure is produced against the elements to be contacted. Furthermore, the expansion sleeve forms the partition between the central duct and the second duct. Depending on the medium flowing through the ducts, the current transmission element is also cooled correspondingly well thereby.

If at least one sealing element is provided to seal off at least one duct, the conditions for connecting the welding torch handle to a hose package without coolant lines can easily be created. The welding torch handle can thus also be used merely to transmit the shielding gas, while the other ducts, which would be used to conduct a coolant, are closed by corresponding sealing elements.

If, according to a further feature of the invention, a tube is provided for inserting into the third duct and at the same time sealing off the connection, a further change in the course of the shielding gas or coolant in the ducts of the welding torch handle can be achieved simply for certain applications.

According to a further feature of the invention, the receiving part has fixing elements on the inside, which interact with fixing elements of complementary shape on the torch closure of the welding torch body. As already mentioned above in connection with the welding torch body, the fixing elements can be formed by corresponding locking noses and guide grooves or the like, to be able to achieve the fixing of the welding torch body in relation to the welding torch handle by a combined axial movement and rotary movement. This allows the welding torch body to be mounted on and removed from the welding torch handle simply, quickly and without tools.

To prevent or impede the welding torch body unintentionally being detached from the welding torch handle, an unlocking element can be provided to unlock the fixing of the welding torch body on the welding torch handle. Such an unlocking element is preferably formed by a spring-preloaded actuation button, which the welder must press or displace counter to the spring force before detaching the welding torch body from the welding torch handle.

A check valve can be arranged in the third duct of the welding torch handle. Such a check valve can prevent residues of a liquid coolant, in particular water, passing out of the third duct into the gas duct of the welding torch body, which could lead to a loss of welding quality during welding. Any water droplets and coolant residues present in front of the check valve are usually removed by being blown out with compressed air before the welding process is carried out.

To operate the welding torch, a switch, button or similar actuating element for switching the welding current on and off is arranged on the welding torch handle.

The object according to the invention is also solved by an aforementioned TIG welding torch having an aforementioned TIG welding torch body and an aforementioned TIG welding torch handle. For the advantages achievable thereby over known welding torches, in particular the greater flexibility in the combination of gas-cooled welding components with water-cooled welding components, reference is made to the above description of the welding torch body and welding torch handle.

The invention is explained in more detail using the attached drawings. In the figures.

Figure 1:
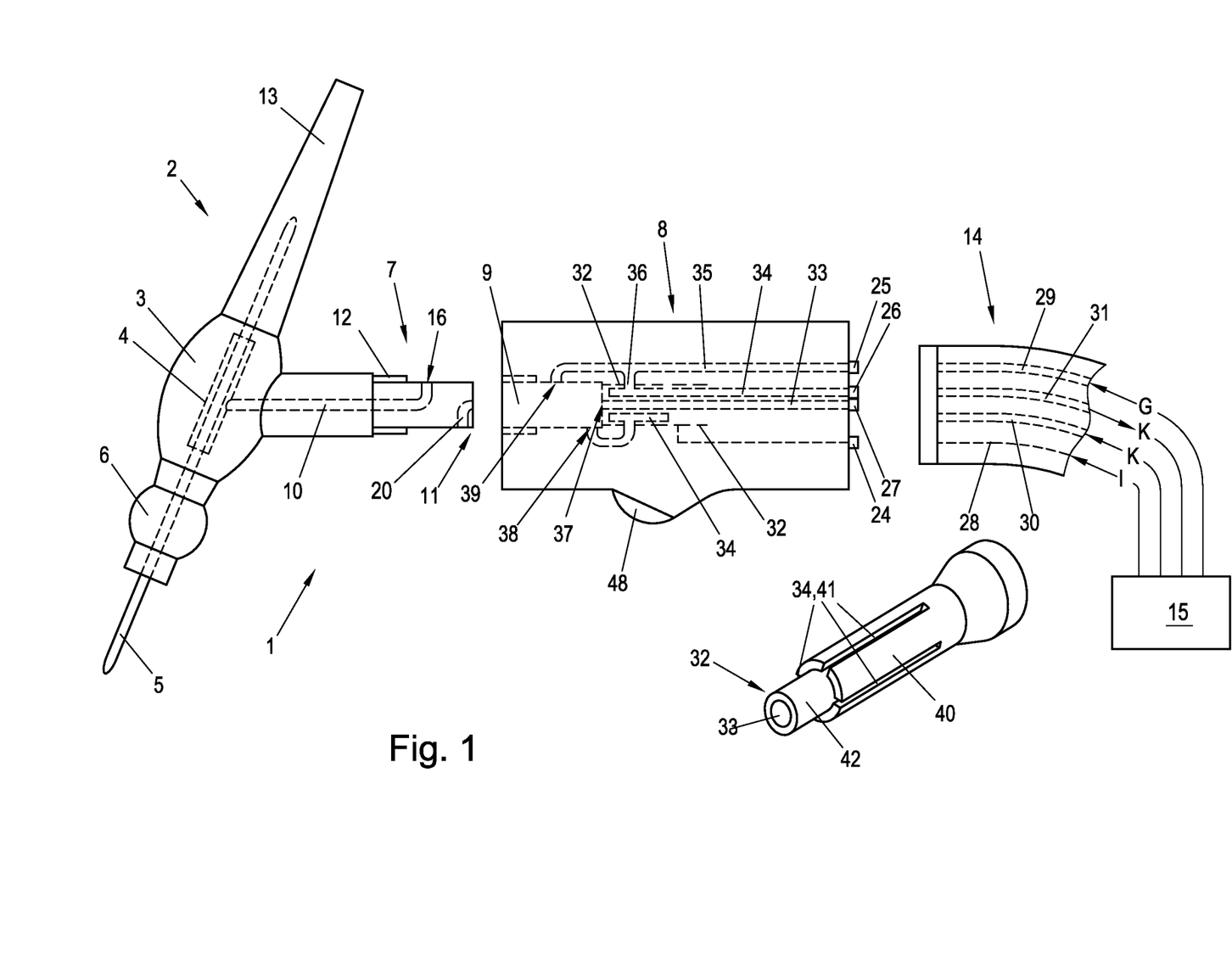
FIG. 1 shows a schematic view of a TIG welding torch according to the invention.

FIG. 1 shows a schematic view of a TIG welding torch 1. The TIG welding torch 1 consists of the TIG welding torch body 2 and the TIG welding torch handle 8. The welding torch body 2 can be connected detachably, preferably detachably without tools, to the welding torch handle 8. The welding torch handle 8 is in turn connected to a corresponding hose package 14 and to the lines and hoses running therein.

Figure 2:
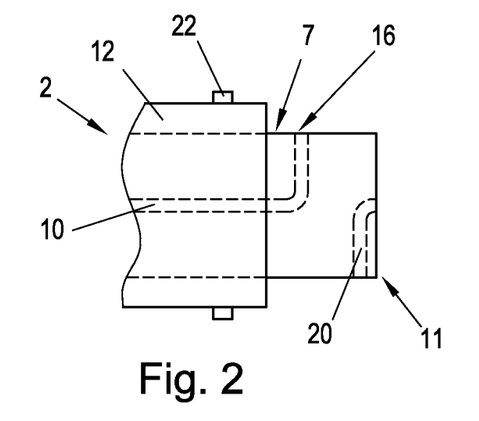
FIG. 2 shows a schematic view of a part of a gas-cooled welding torch body formed according to the invention.
Figure 3:
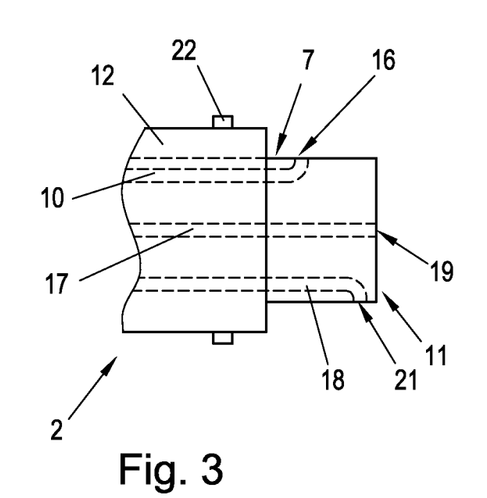
FIG. 3 shows a schematic view of a part of a water-cooled welding torch body formed according to the invention.
Figure 4:
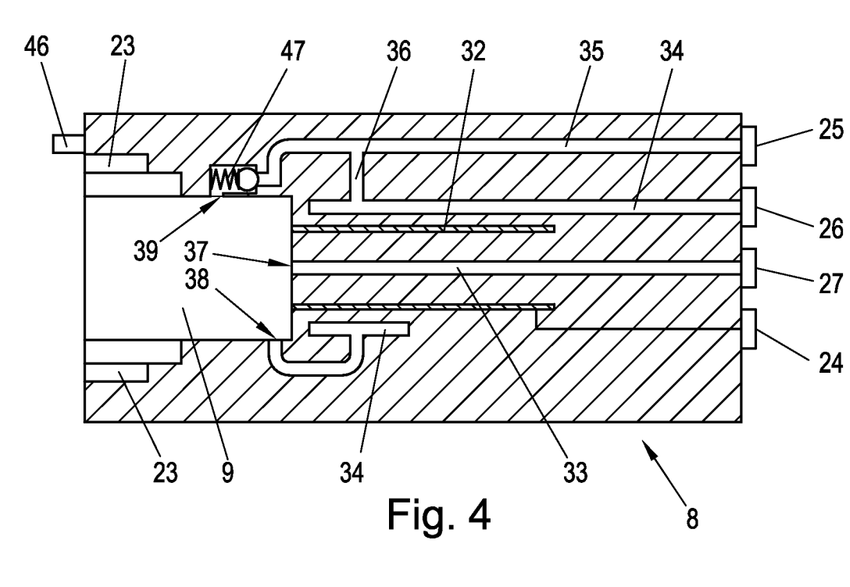
FIG. 4 shows a schematic view of a welding torch handle formed according to the invention for plug-in connection to a welding torch body according to FIG. 2 or FIG. 3.

The welding torch body 2 of the welding torch 1 consists of the so-called torch neck 3, an electrode holder 4 for holding a welding electrode 5, for example a non-consumable tungsten electrode, a gas nozzle 6, and a substantially cylindrical plug-in element 7, which is arranged in the torch neck 3, for detachable connection to a corresponding receiving part 9 of the welding torch handle 8. The gas duct 10 for conducting the shielding gas G to the gas nozzle 6 runs inside the plug-in element 7 of the welding torch body 2. According to the invention, the gas duct 10 not only runs axially inside the plug-in element 7, but this gas duct 10 terminates in an inlet opening 16 arranged on the lateral side of the plug-in element 7, in front of the distal end 11 of the plug-in element 7. By this specific course of the gas duct 10, a specific course of the shielding gas G but also of the coolant K, which may be present, inside the welding torch body 2 can be achieved. The plug-in element 7 of the welding torch body 2 is preferably designed for plug-in connection to the receiving part 9 of the welding torch handle 8 and has a so-called torch closure 12, which is designed to be fixed, preferably rotatably by 180°, on the receiving part 9 of the welding torch handle 8. For example, the welding torch body 2 is inserted into the receiving part 9 of the welding torch handle 8 axially, rotated by 180° relative to the position shown in FIG. 1, and then locked into the position shown in FIG. 1 with the welding torch handle 8 by being rotated back by 180°. To this end, corresponding fixing elements 22 are arranged on the outsides of the torch closure 12 and fixing elements 23 of complementary shape are arranged on the inside of the receiving part 9 of the welding torch handle 8, as illustrated in FIGS. 2, 3 and 4. Assuming certain mechanisms, rotatability of the welding torch body 2 or at least a part thereof and fixing of same in different angular positions can be made possible.

The plug-in element 7 has a further duct 20, which interacts with the ducts 33 and 34, described below, in the welding torch handle 8 and allows a corresponding course of the welding media (shielding gas G and coolant K). Instead of the duct 20, other designs of the plug-in element 7, for example undercuts or the like, which allow the ducts 33 and 34 in the welding torch handle 8 to communicate can also be provided.

If the welding torch body 2 has water cooling or cooling with another coolant K, there is also in the plug-in element 7 a duct 17 for supplying the coolant K and a duct 18 for returning the coolant K, as is explained using the example according to FIG. 3.

The welding torch handle 8 preferably includes connections 24, 25, 26 and 27 for connection to a corresponding welding current line 28 for transmitting the welding current I, a shielding gas line 29 for conveying a shielding gas G, and, where necessary, a coolant supply 30 and a coolant return 31 of a hose package 14, via which a coolant K, in particular water, is supplied and discharged. The hose package 14 can also be connected fixedly to the welding torch handle 8 and be sold as a unit. Usually, such units are available in different hose package lengths. The hose package 14 is correspondingly connected to the welding device 15, which contains the current source for providing the welding current I, a reservoir for providing the shielding gas G, and a container for the coolant K.

The welding torch handle 8 also has a current transmission element 32 for transmitting the welding current I, which comprises a central duct 33. Also arranged in the welding torch handle 8 is the receiving part 9 for detachable connection to the plug-in element 7 of the welding torch body 2. According to the invention, the current transmission element 32 has, in addition to the central duct 33, a second duct 34 arranged coaxially to the central duct 33, and a further third duct 35 is provided coaxially to the second duct, a connection 36 being arranged between the second duct 34 and the third duct 35. The second duct 34 is designed preferably at least partially in the form of an annular space which runs around the central duct 33. The second duct 34 is connected to the connection 26, and the third duct 35 is connected to the connection 25. The welding current I delivered by the current source of the welding device 15 (see FIG. 1) is connected to the current transmission element 32 via the connection 24.

To achieve certain courses of the shielding gas G and of the coolant K, the orifices of the ducts 33, 34, 35 are arranged correspondingly in the receiving part 9 of the welding torch handle 8. The first, central duct 33 of the welding torch handle 8 terminates in an orifice 37 substantially in the centre of the end of the receiving part 9. The second duct 34 is connected to an orifice 38 on the lateral side of the receiving part 9. Finally, the third duct 35 terminates in an orifice 39 arranged on the lateral side of the receiving part 9. When the welding torch body 2 is correspondingly connected to the welding torch handle 8, the orifice 39 of the duct 35 corresponds to the inlet opening 16 of the gas duct 10 in the plug-in element 7 of the welding torch body 2, so that the shielding gas G is allowed to run via the welding torch handle 8 to the welding torch body 2. For certain applications, it is necessary to connect the central duct 33 to the second duct 34, which is effected when the welding torch body 2 is connected, for example via the duct 20 in the plug-in element 7.

It should be noted that the courses and orifices of the ducts illustrated show only an exemplary embodiment, which can also be modified accordingly within the scope of the present invention.

In the water-cooled welding torch body 2 (see FIG. 3), the openings and orifices of the coolant ducts correspond with the orifices in the receiving part 9 of the welding torch handle 8, so that the shielding gas G and coolant K is allowed to run through the desired ducts.

The central duct 33 and the second duct 34 can be formed by a current transmission element 32, which is constructed, for example, from a sleeve 40 of electrically conductive material with axially arranged slots 41. The axially arranged slots 41 form the second duct 34 or part thereof. To separate the second duct 34 from the central duct 33, there is in the sleeve 40 an expansion sleeve 42 of electrically insulating material, which also ensures good electrical contact inside the welding torch handle 8. An exemplary embodiment of such a current transmission element 32 is shown in the bottom right of FIG. 1.

A switch 48, button or similar actuating element for switching the welding current I on and off can also be arranged on the welding torch handle 8.

FIG. 2 shows an embodiment of a gas-cooled welding torch body 2 according to the invention. In addition to the variant according to FIG. 1, a fixing element 22 on the torch closure 12 of the welding torch body 2 is illustrated here and interacts with a correspondingly shaped fixing element 23 on the receiving part 9 of the welding torch handle 8 and allows the welding torch body 2 to be fixed to the welding torch handle 8 by a combined axial and rotating movement.

FIG. 3 shows a schematic view of a water-cooled welding torch body 2 according to the invention. The water-cooled welding torch body 2 has, in addition to the gas duct 10 with the inlet opening 16, a further duct 17 for supplying a coolant K, which is connected to an inlet orifice 19 situated substantially centrally at the distal end 11 of the plug-in element 7. The coolant K is fed back from the gas nozzle 6 of the welding torch body 2 via a duct 18 which is connected to a return opening 21 for the coolant K arranged on the lateral side of the plug-in element 7.

FIG. 4 shows a schematic view of a welding torch handle 8 according to the invention for plug-in connection to a welding torch body 2 according to FIG. 2 or FIG. 3. As already described in connection with FIG. 1, the orifices 37, 38 and 39 of the ducts 33, 34 and 35 of the welding torch handle 8 are situated at certain locations on the receiving part 9, where they coincide or correspond with the relevant orifices or openings in the plug-in element 7 of the welding torch body 2 in question.

On the inside of the receiving part 9 there are fixing elements 23, which interact with fixing elements 22 of complementary shape on the torch closure 12 of the welding torch body 2. On the welding torch handle 8 there can also be an unlocking element 46 for unlocking the fixing of the welding torch body 2, which must be operated by the welder before the welding torch body 2 is removed from the welding torch handle 8.

In the third duct 35 there can be a check valve 47, which prevents residues of the coolant K passing via the orifice 39 into the gas duct 10 of the welding torch body 2 where they could reduce the welding quality during the welding process. Usually, before the welding torch 1 is used, the receiving part 9 of the welding torch handle 8 is blown out with compressed air, so that the ducts through which coolant K has possibly flowed previously are cleared of coolant residues. If the check valve 47 is arranged directly on the orifice 39—as illustrated—this region can also be cleared optimally of coolant residues thereby.

It should be noted that both the welding torch body 2 and the welding torch handle 8 do not—as outlined—have to consist of one main constituent but can be formed from multiple parts which consist of different materials, and the various ducts and connecting elements are formed by appropriate assembly.

Figure 5:
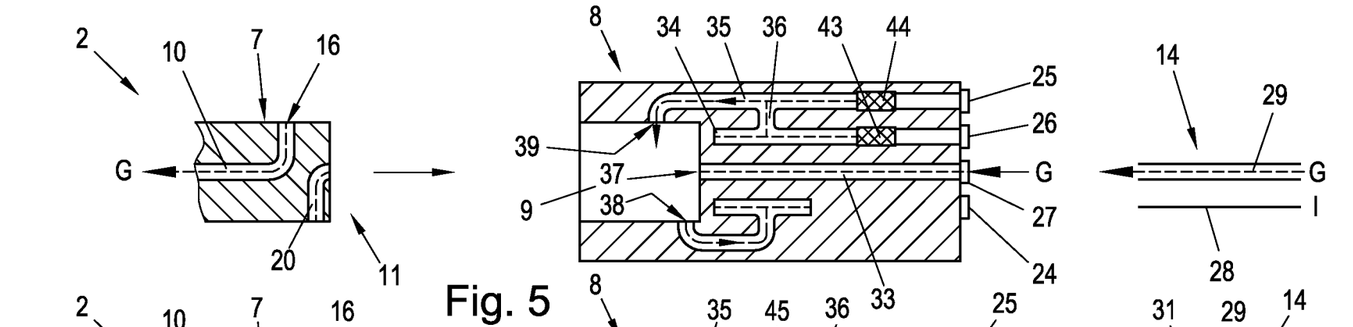
FIG. 5 shows a schematic course of the shielding gas when a gas-cooled welding torch body according to FIG. 2 is connected to the welding torch handle according to FIG. 4 and to a gas-cooled hose package.

FIG. 5 shows the schematic course of the shielding gas G when a gas-cooled welding torch body 2 according to FIG. 2 is connected to the welding torch handle 8 according to FIG. 4 and to a gas-cooled hose package 14. The welding current line 28 of the hose package 14 is connected to the connection 24 for the supply line of the welding current I on the welding torch handle 8 to allow transmission of the welding current I from the connection 24 to the current transmission element 32 of the welding torch handle 8 and then via the plug-in element 7 or the current-carrying part thereof to the electrode holder 4 and finally the welding electrode 5 of the welding torch body 2.

The shielding gas line 29 of the hose package 14 is connected to the connection 27 of the welding torch handle 8 for supplying the shielding gas G, which is connected to the central duct 33. When a gas-cooled welding torch body 2 is connected, the shielding gas G runs through the axial duct 33 inside the welding torch handle 8 and is directed laterally through the duct 20 in the plug-in element 7 of the welding torch body 2, passes via the orifice 38 into the second duct 34 of the welding torch handle 8 and via the connection 36 into the third duct 35. The shielding gas G passes via the orifice 39, arranged on the lateral side of the receiving part 9, of the welding torch handle 8, into the inlet opening 16 in the plug-in element 7 and finally to the gas nozzle 6 of the welding torch body 2, where it accordingly shields the arc during the welding process.

To prevent the shielding gas G escaping via the connections 25, 26 of the ducts 34, 35, appropriate sealing elements 43, 44 are arranged in the ducts 34, 35. These sealing elements can for example be inserted into the ducts 34, 35 and axially fixed. Of course, the sealing elements 43, 44 can also contain sealing rings consisting of elastic material (not shown) or else be designed differently, for example in the form of caps or the like on the connections 25, 26.

Figure 6:
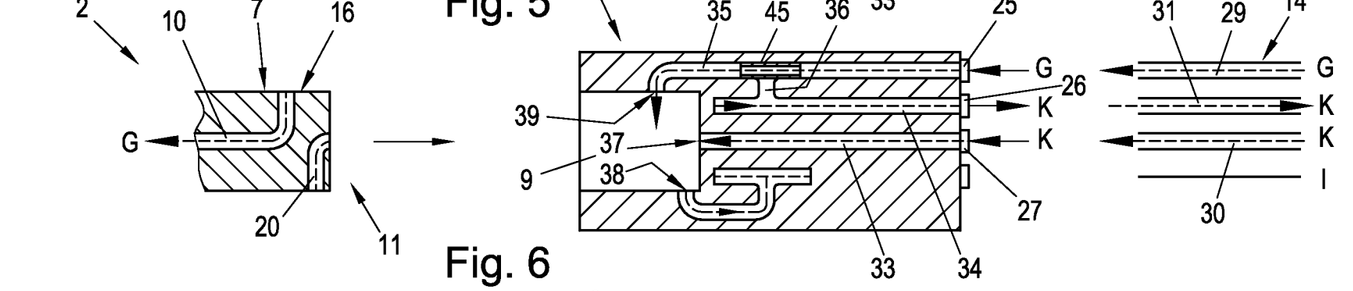
FIG. 6 shows a schematic course of the shielding gas and coolant when a gas-cooled welding torch body according to FIG. 2 is connected to the welding torch handle according to FIG. 4 and to a water-cooled hose package.

FIG. 6 shows the schematic course of the shielding gas G and coolant K when a gas-cooled welding torch body 2 according to FIG. 2 is connected to the welding torch handle 8 according to FIG. 4 and to a water-cooled hose package 14. Here, the shielding gas line 29 of the hose package 14 is connected to the connection 25 of the third duct 35. The coolant supply 30 is connected to the connection 27 of the central duct 33, and the coolant return 31 is connected to the connection 26 of the second duct 34. A tube 45, which closes the connection 36 between the third duct 35 and the second duct 34, is inserted into the duct 35. The shielding gas G thus runs via the connection 25 and the third duct 35 into the orifice 39 and into the inlet opening 16 of the gas duct 10 to the gas nozzle 6 of the welding torch body 2. The coolant K runs via the central duct 33 to the orifice 37 and is directed via the duct 20 of the welding torch body 2 into the orifice 38 and finally into the second duct 34 of the welding torch handle 8, from where it passes to the coolant return 31 of the hose package 14. The coolant K is prevented from flowing into the third duct 35 by the tube 45 and the closure of the connection 36 between the second duct 34 and the third duct 35. The fact that the coolant K also flows through part of the welding torch handle 8 means that the latter can likewise be cooled, in particular in the region of the current transmission element 32.

Figure 7:
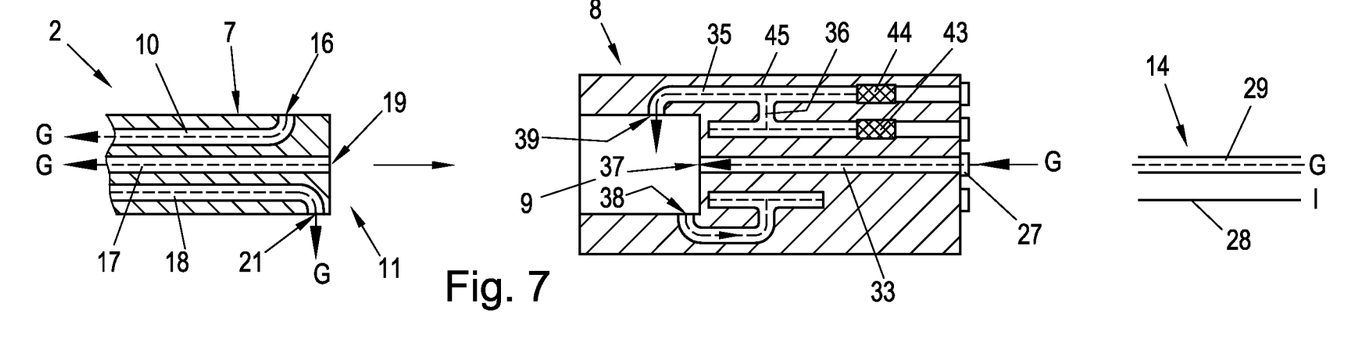
FIG. 7 shows a schematic course of the shielding gas when a water-cooled welding torch body according to FIG. 3 is connected to the welding torch handle according to FIG. 4 and to a gas-cooled hose package.

FIG. 7 shows the schematic course of the shielding gas G when a water-cooled welding torch body 2 according to FIG. 3 is connected to the welding torch handle 8 according to FIG. 4 and to a gas-cooled hose package 14. In this variant, the shielding gas line 29 of the hose package 14 is connected to the connection 27 of the welding torch handle 8, as a result of which the shielding gas G runs through the central duct 33, from the orifice 37 into the central inlet orifice of the duct 17 at the distal end 11 of the plug-in element 7 of the welding torch body 2, via the duct 18 to the return opening 21, and via the orifice 38 in the receiving part 9 of the welding torch handle 8 into the second duct 34. Finally, the shielding gas G runs via the connection 36 into the third duct 35 and via the orifice 39 into the inlet opening 16 of the gas duct 10 in the plug-in element 7 of the welding torch body 2. Thanks to the specific course of the shielding gas G through the ducts 17, 18 of the welding torch body 2 as well, better cooling of the latter is made possible.

Figure 8:
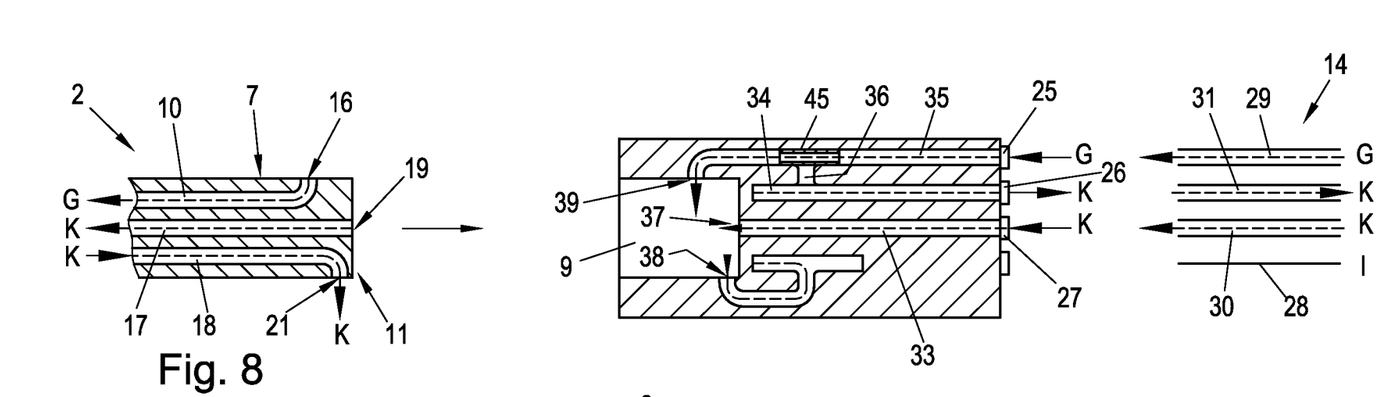
FIG. 8 shows a schematic course of the shielding gas and coolant when a water-cooled welding torch body according to FIG. 3 is connected to the welding torch handle according to FIG. 4 and to a water-cooled hose package.

FIG. 8 shows the schematic course of the shielding gas G and coolant K when a water-cooled welding torch body 2 according to FIG. 3 is connected to the welding torch handle 8 according to FIG. 4 and to a water-cooled hose package 14. In this variant, the shielding gas line 29 of the hose package 14 is connected to the connection 25 of the welding torch handle 8, as a result of which the shielding gas G passes via the duct 35 to the orifice 39 and via the inlet opening 16 in the plug-in element 7 into the gas duct 10 and to the gas nozzle 6 of the welding torch body 2. To prevent the shielding gas G flowing via the connection 36 into the second duct 34, a tube 45, which closes the connection 36, is arranged in the duct 35, in a similar manner to the variant according to FIG. 6. The coolant supply 30 of the hose package 14 is connected to the connection 27, which is connected to the duct 33 in the welding torch handle 8, so that the coolant K can pass via the duct 33 and the orifice 37 into the inlet orifice 19 of the duct 17 at the distal end 11 of the plug-in element 7 to the gas nozzle 6 and finally passes via the duct 18 and the return opening 21 into the orifice 38 in the receiving part 9 of the welding torch handle 8 and passes there into the second duct 34 and finally to the connection 26, which is connected to the coolant return 31 of the hose package 14.

Figure 9:
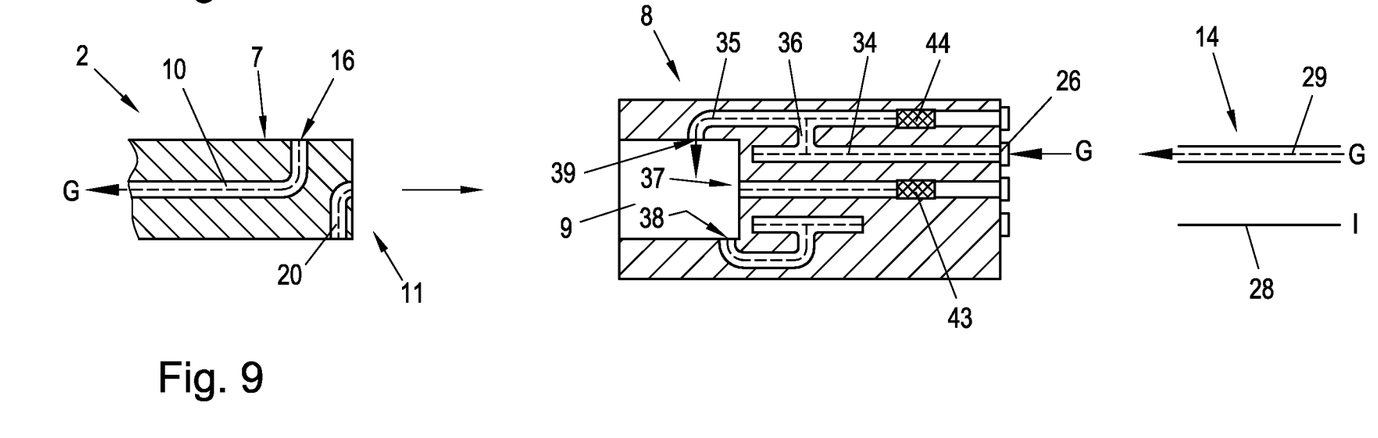
FIG. 9 shows a schematic course of the shielding gas when a gas-cooled welding torch body according to FIG. 3 is connected to the welding torch handle according to FIG. 4 and to a gas-cooled hose package, in an alternative manner to FIG. 5.

Finally, FIG. 9 shows a schematic course of the shielding gas G when a gas-cooled welding torch body 2 according to FIG. 3 is connected to the welding torch handle 8 according to FIG. 4 and to a gas-cooled hose package 14, in an alternative manner to FIG. 5. This variant is suitable in particular for higher power levels, it being ensured that the shielding gas G in the hose package 14 is not excessively heated by the welding current line 28 and is relatively cool as it passes into the welding torch handle 8. By means of this specific course of the shielding gas G through the welding torch handle 8, the critical temperature of the handle shell, which must not be more than 30° C. above ambient temperature according to applicable standards, can be complied with. In this variant, the shielding gas line 29 of the hose package 14 is connected to the connection 26 of the welding torch handle 8, which is connected to the second duct 34. The shielding gas G passes via the second duct 34 and the connection 36 into the third duct 35 and finally via the orifice 39 into the inlet opening 16 of the gas duct 10 in the plug-in element 7 of the welding torch body 2. The central duct 33 and the third duct 35 are sealed off by an appropriate sealing element 43, 44. In particular, the welding torch handle 8 can be cooled better by this alternative routing of the shielding gas G.

FIGS. 5 to 9 are also schematic illustrations of the welding torch body 2 and welding torch handle 8, which can be designed in different ways to achieve the respective functions.

The welding torch according to the present invention stands out on account of a simple design, great flexibility in connecting a gas-cooled welding torch body or water-cooled welding torch body to a welding torch handle and to a gas-cooled hose package or water-cooled hose package.

The invention claimed is:

1. A TIG welding torch body (2), having a torch neck (3), an electrode holder (4) for holding a welding electrode (5), a gas nozzle (6) and a cylindrical plug-in element (7) arranged in the torch neck (3) for detachable connection to a receiving part (9) of a welding torch handle (8) via a torch closure, which plug-in element (7) has an inlet opening (16) for the shielding gas (G) and a gas duct (10), connected to the inlet opening (16), for conducting the shielding gas (G) to the gas nozzle (6) and is designed to transmit a welding current (I) to the electrode holder (4), wherein the gas duct (10) terminates in front of the distal end (11) of the plug-in element (7) in an inlet opening (16) arranged on the lateral side of the plug-in element (7), a central inlet orifice (19) is provided at the distal end (11) of the plug-in element (7), and a return opening (21) terminates on the lateral side of the plug-in element (7) in front of the distal end (11) of the plug-in element (7).

2. The TIG welding torch body (2) according to claim 1, wherein the plug-in element (7) has the torch closure (12) for detachably connecting the plug-in element to the receiving part (9) of the welding torch handle (8).

3. The TIG welding torch body (2) according to claim 1, wherein the plug-in element (7) has a duct (17) for supplying a coolant (K) and a duct (18) for returning the coolant (K), wherein the duct (17) for supplying the coolant (K) is connected to the central inlet orifice (19) at the distal end (11) of the plug-in element (7), and the duct (18) for returning the coolant (K) is connected to the return opening (21) arranged on the lateral side of the plug-in element (7).

4. The TIG welding torch body (2) according to claim 1, wherein the central inlet orifice (19) is connected to the return opening (21) arranged on the lateral side of the plug-in element (7).

5. The TIG welding torch body (2) according to claim 1, wherein the torch closure (12) is of tubular design and has fixing elements (22) on the outside, which interact with fixing elements (23) of complementary shape on the receiving part (9) of the welding torch handle (8).

6. The TIG welding torch body (2) according to claim 1, wherein the plug-in element (7) is formed from metal, and the torch closure (12) is formed from plastic.

7. A TIG welding torch handle (8), having a current transmission element (32) with a central duct (33) and a receiving part (9) for detachable connection to a plug-in element (7) of a welding torch body (2) via a torch closure, wherein a second duct (34) arranged coaxially to the central duct (33) and a further third duct (35) arranged coaxially to the second duct are provided, wherein a connection (36) is provided between the second duct (34) and the third duct (35), and the first duct (33) has an orifice (37) in the center of the receiving part (9), the second duct (34) has an orifice (38) on the lateral side of the receiving part (9), and the third duct (35) has an orifice (39) on the lateral side of the receiving part (9).

8. The TIG welding torch handle (8) according to claim 7, wherein the current transmission element (32) comprises a sleeve (40) of electrically conductive material with axially arranged slots (41) for forming the second duct (34) and an expansion sleeve (42) of electrically insulating material, wherein the central duct (33) runs in the interior of the expansion sleeve (42).

9. The TIG welding torch handle (8) according to claim 7, wherein at least one sealing element (43, 44) is provided to seal off at least one duct (33, 34, 35).

10. The TIG welding torch handle (8) according to claim 7, wherein a tube (45) is provided for insertion into the third duct (35) and at the same time sealing off the connection (36).

11. The TIG welding torch handle (8) according to claim 7, wherein the receiving part (9) has fixing elements (23) on the inside, which interact with fixing elements (22) of complementary shape on the torch closure (12) of the welding torch body (2).

12. The TIG welding torch handle (8) according to claim 11, wherein an unlocking element (46) is provided to unlock the fixing of the welding torch body (2).

13. The TIG welding torch handle (8) according to claim 7, wherein a check valve (47) is arranged in the third duct (35).

14. The TIG welding torch handle (8) according to claim 7, wherein a switch (48) for switching the welding current (I) on and off is arranged on the welding torch handle (8).

15. A TIG welding torch (1) having the TIG welding torch body (2) according to claim 1 and a TIG welding torch handle (8).

16. The TIG welding torch body (2) according to claim 2, wherein the torch closure (12) comprises a plurality of first fixing elements (22) arranged on an outside of the torch closure (12) and the welding torch handle (8) comprises a plurality of second fixing elements (23) of complementary shape arranged on an inside of the receiving part (9) of the welding torch handle (8) such that the torch closure (12) is configured to be inserted axially at an insertion position into the receiving part (9) of the welding torch handle (8), rotated by 180° relative to the insertion position, and rotated back by 180° to lock the torch closure axially to the receiving part.

* * * * *